United States Patent [19]

Leuty

[11] Patent Number: 4,605,098
[45] Date of Patent: Aug. 12, 1986

[54] TRUCK BUMPER STEP

[76] Inventor: David S. Leuty, 1025 S. Gay Dr., Longmont, Colo. 80501

[21] Appl. No.: 695,381

[22] Filed: Jan. 28, 1985

[51] Int. Cl.$^4$ .............................................. B60R 3/00
[52] U.S. Cl. ...................................... 182/92; 280/163
[58] Field of Search .................... 182/90, 91, 92, 89; 280/163; 24/199

[56] References Cited

U.S. PATENT DOCUMENTS

| | | | |
|---|---|---|---|
| 1,718,291 | 6/1929 | Guenther | 24/199 |
| 1,876,849 | 9/1932 | Bronson | 280/163 |
| 3,404,751 | 10/1968 | Nosworthy | 182/92 |
| 3,887,216 | 6/1975 | Perry | 182/90 |
| 4,054,298 | 10/1977 | Urbaitis | 182/92 |
| 4,405,141 | 9/1983 | Jurek | 182/92 |

FOREIGN PATENT DOCUMENTS 1016577  8/1977  Canada ................................. 182/92

Primary Examiner—Reinaldo P. Machado
Attorney, Agent, or Firm—William E. Hein

[57] ABSTRACT

A bumper step for enabling the user to conveniently access the engine compartment of a truck is formed from steel plate material, for example, to include a lip for removably hooking the bumper step over a conventional truck bumper at any location therealong and a step member on which the user may conveniently stand. In one embodiment of the invention, an adjustable strap is provided between two components of the invention to facilitate adjustment of the height above ground of the bumper step.

2 Claims, 4 Drawing Figures

TRUCK BUMPER STEP

BACKGROUND AND SUMMARY OF THE INVENTION

This invention relates generally to pickup trucks, commercial trucks, and other high clearance vehicles and more specifically to a removable bumper step for quick attachment to such vehicles to permit easy access to the engine compartments thereof. Operators of pickups and larger trucks, as well as mechanics, have, in the past, experienced difficulty accessing the engine compartments of such vehicles because of their height off the ground. That access is necessary to perform such routine maintenance as checking lubrication levels on dip sticks as well as maintenance that requires access for extended periods of time, often to the farthest reaches of the engine compartment. In the past, persons requiring access to the engine compartments of such vehicles have generally had to stretch over the fender of such a vehicle, stand on the front bumper, or employ objects such as boxes, ladders, saw horses, milk crates and the like. These methods of access are all disadvantageous for one reason or another. For example, it has been found difficult, if not impossssible to gain access to the rear areas of the engine compartment of such a vehicle by reaching over the fender. Scratching of the fender paint in such instances is almost assured, and injury is very likely to occur as the result of slippage on the typical chrome bumper. Objects such as ladders, milk crates, etc. employed to gain a height advantage also present a serious safety problem for the user.

It is therefore a principal object of the present invention to provide a portable bumper step that may be quickly and easily connected to and removed from any desired position along the front bumper of a truck to permit safe and ready access to all areas of the engine compartment. This object, as well as other incidental objects, is accomplished in accordance with the illustrated preferred embodiments of the present invention by employing a piece of steel plate that has been formed to provide a lip portion, adapted to hook over the truck bumper, and a horizontal step portion upon which the user can safely and comfortably stand for extended periods of time. The bumper step is preferably coated with a rubberized substance to increase its safety characteristics. Once the user has completed the particular maintenance task at hand requiring use of the bumper step, it may be quickly removed from the bumper and stored in the passenger compartment of the vehicle for future use.

DESCRIPTION OF THE PREFERRED EMBODIMENT

Figure 2:
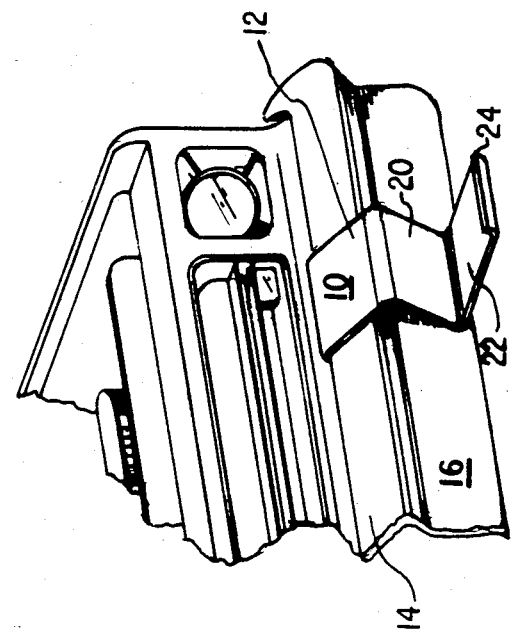
FIG. 2 is a pictorial illustration of the way in which the bumper step of FIG. 1 is attached to the front bumper of a typical pickup truck.
Figure 1:
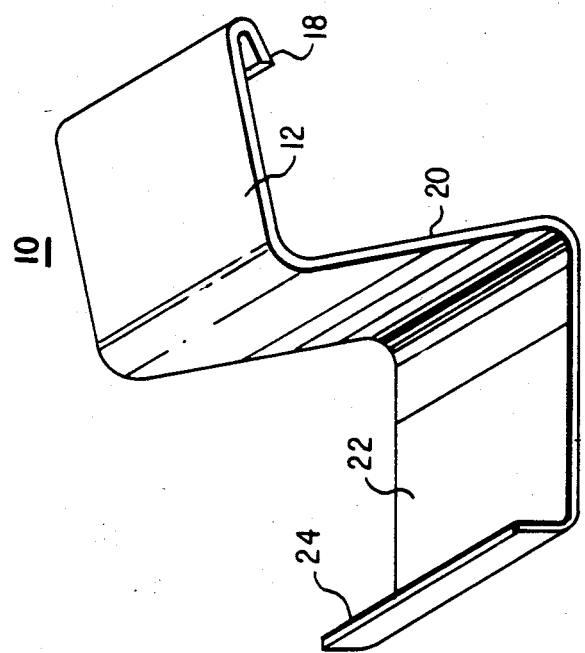
FIG. 1 is an illustration of a bumper step constructed in accordance with one embodiment of the present invention.

Referring now to FIGS. 1 and 2, there is shown a bumper step 10 that may be constructed of steel, aluminum or any other material found to provide the necessary strength to enable the user to stand thereon without thereby causing the step to become deformed. It has been found that steel plate 3/16 inch in thickness provides the necessary strength yet may be readily formed to the desired shape using shop tools that are commercially available. Bumper step 10 is thus formed, as illustrated, to include a forwardly sloping top portion 12, the slope of which is approximately the same as the slope of the top surface 14 of the typical front bumper 16 of a pickup truck, as shown in FIG. 2. Bumper step 10 also includes a forwardly turned under lip portion 18 adapted to be hooked over the top surface 14 of bumper 16. Bumper step 10 further includes a downwardly and slightly inwardly sloping vertical portion 20 and a foot rest portion 22 that is formed to be horizontal when the bumper step 10 is hooked into place over bumper 14. Vertical portion 20 may be formed to any length to achieve a desired height above ground of foot rest portion 22. A convenient width for step bumper 10 has been found to be in the neighborhood of four inches in the case of a single foot bumper step. If it is desired to provide space for the user to stand with both feet on bumper step 10, an overall width of approximately eight inches is suggested. Foot rest portion 22 terminates in a retaining lip 24 that is formed by a right angle bend upward from foot rest portion 22. After being formed to the desired dimensions, bumper step 10 is preferable dipped in a rubber bath according to conventional rubberizing processes to coat the bumper step 10 with a rubberizing material for the purposes of minimizing any tendency toward slippage of the user's foot during use and also to protect the vehicle bumper surfaces against scratching. In use, bumper step 10 is simply hooked over the top surface 14 of bumper 16 at any desired position therealong, as illustrated in FIG. 2. Since permanent attachment to the bumper 16 is undesirable and unnecessary, bumper step 10 may quickly and easily removed following completion of a particular maintenance task and stored for future use in the passenger compartment of the vehicle, if desired.

Figure 4:
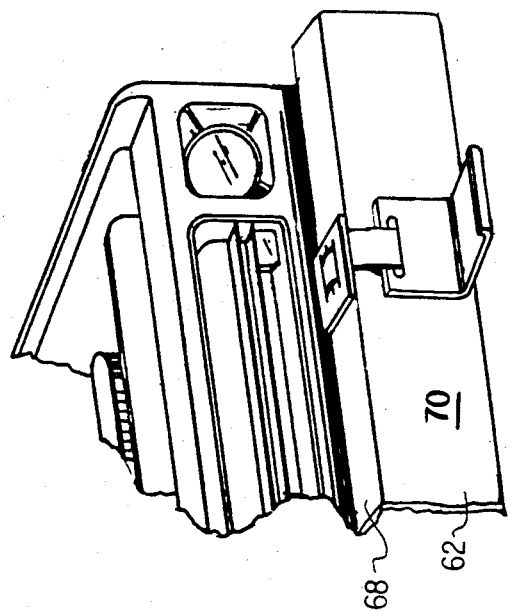
FIG. 4 is a pictorial illustration of the way in which the bumper step of FIG. 3 is attached to the typical front bumper of a larger truck.
Figure 3:
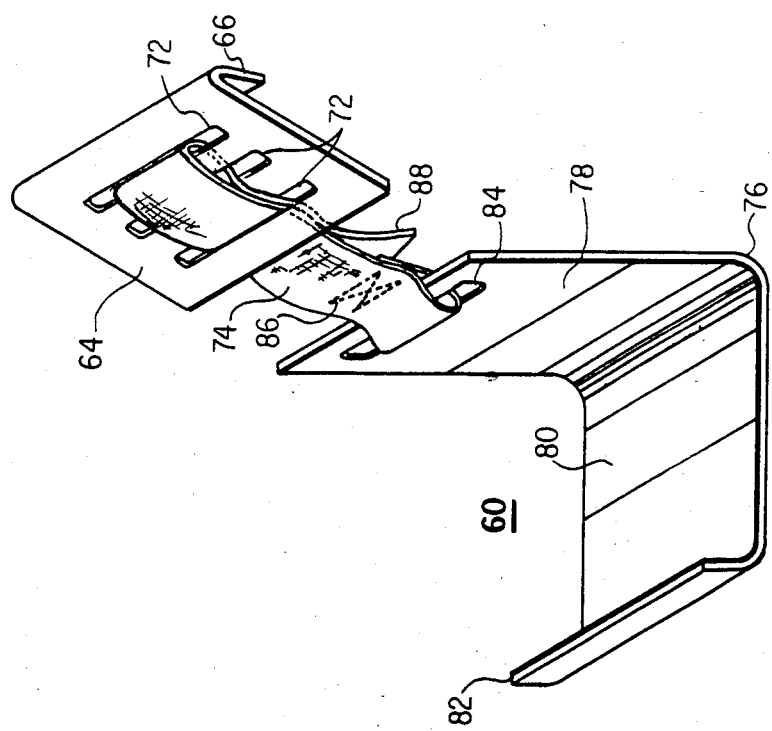
FIG. 3 is a detailed illustration of a universal adjustable bumper step constructed in accordance with another embodiment of the present invention.

Referring now to FIGS. 3 and 4, there is shown an alternative bumper step 60 that is adapted for use on heavy duty trucks that typically include a front bumper 70 having a substantially vertical front surface 62. Bumper step 60 includes a generally flat clip member 64 that, in turn, includes a forwardly turned under lip portion 66 adapted to be hooked over the top surface 68 of bumper 70. Clip member 64 includes three slots 72 through which a strap 74 may be laced. Bumper step 60 further includes a step member 76 that is formed to include a vertical portion 78 and a foot rest portion 80 that is formed by a right angle bend outward from vertical portion 78. Vertical portion 78 includes a slot 84 for receiving strap 74. Horizontal portion 80 terminates in a retaining lip 82 that is formed by a right angle bend upward from foot rest portion 80. One end of strap 74, which may comprise any of a number of commercially available types of nylon webbing, for example, is placed through slot 84 and then fixedly attached to itself by means of stitching 86. The free end 88 of strap 74 is laced through the slots 72 in clip member 64 in any of several conventional ways to provide against slippage, while at the same time permitting adjustment of the length of the strap 74 extending between clip member 64 and step member 76. In use, lip portion 66 of clip member 64 is hooked over top surface 68 of bumper 70. Strap 74 is adjusted to position step member 76 of bumper step 60 at a desired height above ground. The construction considerations relative to the width of bumper step 60 and the application thereto of a rubberized coating are the same as outlined above in connection with the detailed description of bumper step 10 illustrated in FIGS. 1 and 2.

I claim:

1. A bumper step adapted for removable connection to the front bumper of a motor vehicle for providing a stable platform on which the user may stand to gain access to the engine compartment of such vehicle, the bumper step comprising:
   a generally flat clip member including a forwardly turned under lip portion adapted to be hooked over and behind a top surface of said bumper, said clip member further including a plurality of horizontal slots for adjustably receiving a flexible strap;
   a step member, including a vertical portion and a platform portion that is formed at a right angle to said vertical portion, said vertical portion including a horizontal slot for receiving a flexible strap; and
   a length of flexible strap, one end of which is fixedly attached to said step member through the horizontal slot therein and the other end of which is adjustably placed through said plurality of horizontal slots in said clip member, whereby the height above ground of said step member may be adjusted as desired by the user.

2. A bumper step as in claim 1 wherein said clip member and said step member are coated with a rubberizing substance.

* * * * *